Patented Aug. 4, 1936

2,049,608

UNITED STATES PATENT OFFICE 2,049,608

METHOD OF TREATING GASEOUS MEDIA

Glenn C. Forrester, Niagara Falls, N. Y.

No Drawing. Application April 27, 1934,
Serial No. 722,633

8 Claims. (Cl. 252—2.5)

This invention relates to the absorption of vapors of various volatile liquids or solids from air or from other gaseous media or carriers, either for recovering said volatile substances or for purifying the gaseous media or carriers.

The ideal method of removing vapors of various volatile liquids or solids from a gaseous system by an absorbent should embody the following characteristics:

1. The absorbent should be of such a nature that when the vapors combine therewith, the absorption product possesses negligible vapor pressure, whereby absorption of the vapors from the gaseous system may be complete, not reversible, and effective for low as well as for high concentrations of vapors.

2. The absorbent should be of such a nature that the absorbed material can be recovered by a simple and inexpensive operation, unaltered chemically and with negligible loss.

3. The absorbent should be of low cost, and preferably also of the type which can be regenerated economically.

4. The absorption action should be rapid, i. e. recovery should be complete when treating a large volume of the gaseous carrier per unit of weight of absorbent per hour.

5. The weight of vapors absorbed per unit of weight of absorbent should be high.

6. The absorbent should be inert to the rest of the gaseous system.

7. The absorbent, both fresh and spent, should be capable of convenient handling and of suitable form to permit rapid and intimate contact with a gaseous system.

I have found that perchlorates, more particularly metallic perchlorates, and specifically magnesium perchlorate, possess characteristics which satisfy, to a practical extent, the characteristics desired for an ideal absorbent, as above mentioned.

It is, therefore, an object of this invention to provide a method of removing vapors of various volatile liquids or solids from a gaseous medium for the purpose of recovering said vapors or for purifying said gaseous medium by the use of a perchlorate or combination of perchlorates as an absorbent.

Another object of this invention is to provide an absorbent for vapors of volatile liquids or solids comprising a perchlorate or combination of perchlorates, whereby such vapors may be removed from a gaseous medium containing the same for substantially the purposes set forth.

Other objects will become apparent from the following description and appended claims.

In accordance with the principles of the instant invention, a gaseous medium containing vapors of volatile liquids or solids, preferably after the removal of suspended foreign particles and moisture, is passed through or mixed with or otherwise brought in contact with an absorbent, hereafter more fully described, whereby the volatile vapors combine with or are absorbed by said absorbent and removed from said gaseous medium. The absorption is continued until the vapor pressure of the absorbent and absorbed material approaches the partial pressure of the vapor to be absorbed in the gaseous medium. When the process is for the purpose of recovering the vaporized substances, the absorbent, together with the combined or absorbed material, is subjected to a process whereby the combined or absorbed material is separated from the absorbent and recovered. The absorbent is then subjected to a treatment whereby it is regenerated and then again utilized in the process. Alternatively, when the process is used for the purpose of purifying a gaseous medium, the absorbent, together with the absorbed material, may also be treated in the manner aforementioned for the purpose of regenerating the absorbent if the economics of the process warrant.

The preferred absorbent is one which does not deliquesce under ordinary conditions, yet has great absorption powers both with respect to quantity of substance held per unit weight of perchlorate, and firmness with which these substances are held; is easily regenerated without decomposition with a minimum of mechanical difficulties. Magnesium perchlorate is the specific preferred absorbent because it possesses the characteristics just enumerated.

I have found, however, that other metallic perchlorates, such as calcium, barium, strontium, zinc, cobalt, nickel, manganese, aluminum, etc., which normally contain water of crystallization and which can be successfully dehydrated without decomposition, may be used as absorbents. However, they are not as desirable as magnesium perchlorate for one or more of several reasons: namely, greater tendency to deliquesce; practical difficulties in dehydrating; low capacity to hold substances per unit weight of perchlorate; relatively higher vapor pressures exhibited by the combinations of these perchlorates and substances.

Anhydrous magnesium perchlorate absorbs moisture avidly. Thus, when anhydrous magnesium perchlorate is exposed to the atmosphere, it takes up moisture rapidly until it has gained approximately 50% in weight, at which point further noticeable increase ceases at normal humidity. The resulting product corresponds to the formula $Mg(ClO_4)_2 \cdot 6H_2O$, and the water is believed to be combined as water of crystallization. This increase in weight may be stopped at any intermediate point by removing it from exposure to moisture and storing it under conditions where it will not absorb any additional moisture, such as, for example, by storage in a desiccator. Conversely, the hydrated salts may be treated, such as by gradually heating under reduced pressure, to produce an anhydrous compound or a compound having a predetermined amount of moisture. A salt substantially free of water may be obtained by heating at 250° C. and 1 mm. pressure. Also, this result can be secured by using lower temperatures and higher pressures than those named.

To secure greatest absorptive capacity and greatest retentive power, magnesium perchlorate of maximum dehydration is preferably employed. However, even completely hydrated magnesium perchlorate shows significant absorptive powers for vapors of certain substances. I have found that for many purposes magnesium perchlorate, partially dehydrated, for example, one dehydrated to such a degree that it is capable of adding 36% of its weight of moisture, or one capable of adding 32% of its weight of moisture, is satisfactory. Hereafter, the expressions "36% magnesium perchlorate" and "32% magnesium perchlorate" are used to define magnesium perchlorate which is capable of adding 36% and 32% of its weight of moisture when exposed to an atmosphere of 30% relative humidity, respectively. The same terminology is used with the other absorbents herein specifically mentioned.

Vapors of numerous volatile substances may be absorbed by the absorbents contemplated by this invention. As illustrative examples of volatile compounds which have been successfully and effectively removed from air containing the same, in accordance with the principles of this invention, may be mentioned alcohols, acids, esters, acid anhydrides, aldehydes, ketones, and amines, and, to a smaller degree, ethers and phenols.

The following table shows the indicated absorption of several illustrative substances when weighted quantities of said substances are vaporized and the air bearing the vapors is passed through weighted absorption tubes containing weighted quantities of magnesium perchlorate of varying indicated degrees of water absorptive capacity:

| Substance | Absorbent plus percent of substance | Vapor concentration in gm. per liter | Rate of gas flow: cu. ft. per hr. per lb. perchlorate | Absorption |
|---|---|---|---|---|
| | | | | Percent |
| Methyl alcohol | 36% Mg(ClO₄)₂----None-- | .1216 | 3.68 | 99.6 |
| Ethyl alcohol | 36% Mg(ClO₄)₂----25%-- | .1184 | 23.36 | 100.0 |
| Isopropyl alcohol | 36% Mg(ClO₄)₂----33%-- | .0647 | 41.22 | 100.0 |
| Amyl alcohol | 32% Mg(ClO₄)₂--30.5%-- | .0154 | 46.37 | 100.0 |
| Butyl alcohol | 36% Mg(ClO₄)₂----None-- | .0108 | 39.49 | 100.0 |
| Ethylene chlorhydrin | 36% Mg(ClO₄)₂----None-- | .018 | 2.08 | 96.9 |
| Formic acid | 36% Mg(ClO₄)₂----None-- | .054 | 2.08 | 99.2 |
| Acetic acid | 36% Mg(ClO₄)₂----None-- | .048 | 1.85 | 99.5 |
| Ethyl acetate | 46% Mg(ClO₄)₂---47.2%-- | .432 | 39.84 | 92.0 |
| Butyl acetate | 36% Mg(ClO₄)₂----None-- | .0321 | 1.3 | 97.0 |
| Ethyl lactate | 29.4% Mg(ClO₄)₂--None-- | .0193 | 2.52 | 99.1 |
| Ethyl acetoacetate | 30.1% Mg(ClO₄)₂--None-- | .0093 | 3.75 | 96.5 |
| Acetic anhydride | 36% Mg(ClO₄)₂----None-- | .0228 | 1.97 | 100.0 |
| Paralydehyde | 46% Mg(ClO₄)₂----None-- | .157 | 36.06 | 100.0 |
| Furfural | 29.4% Mg(ClO₄)₂--None-- | .0116 | 2.7 | 99.6 |
| Formaldehyde (30%) | 36% Mg(ClO₄)₂----None-- | .0231 | 3.26 | 81.0 |
| Acetone | 36% Mg(ClO₄)₂----None-- | .55 | 2.45 | 99.4 |
| Methyl-ethylketone | 36% Mg(ClO₄)₂----None-- | .33 | 50.3 | 100.0 |
| Aceto-phenone | 36% Mg(ClO₄)₂----None-- | .00167 | 42.36 | 100.0 |
| Diethyl amine | 36% Mg(ClO₄)₂----None-- | .5508 | 4.8 | 96.4 |
| Aniline | 30.1% Mg(ClO₄)₂--None-- | .0043 | 3.36 | 96.8 |
| Monomethyl ether of diethylene glycol | 29.4% Mg(ClO₄)₂--None-- | .0326 | 2.97 | 99.1 |
| Monoethyl ether of diethylene glycol | 30.1% Mg(ClO₄)₂--None-- | .0014 | 3.43 | 93.5 |
| Diethyl ether | 36% Mg(ClO₄)₂----None-- | High | Slow | 84.0 |
| Benzyl-ethyl ether | 36% Mg(ClO₄)₂---38.4%-- | .019 | 6.87 | 86.0 |
| 1,4 dioxane | 30.1% Mg(ClO₄)₂--None-- | .1015 | 1.56 | 73.5 |

One of the characteristic features of the absorbents contemplated by the instant invention is that the absorbent plus the absorbed substance possesses a very low vapor pressure, even when the weight of vapor absorbed per unit weight of absorbent is relatively high. As a consequence, substantially complete or nearly complete removal of the vapors of the volatile substances from a gaseous medium, even when they are present in the gaseous media in such small amounts as to exhibit very low partial pressures, and even after substantial amounts of the vapors have already been absorbed, can be effected.

To illustrate, the following table sets forth the observed vapor pressures of definite amounts of magnesium perchlorate of varying indicated degrees of water absorptive capacity, plus definite amounts of volatile substances, and also the vapor pressure of the pure volatile substances, the vapor pressures being measured and calculated by a dynamic method:

| Percent perchlorate | Percent of substance contained | Vapor pressure observed | Vapor pressure of pure substance |
|---|---|---|---|
| | | mm. | mm. |
| 19.7% Mg(ClO₄)₂ | 12.2% ethyl acetate | .08 | 106 |
| 19.7% Mg(ClO₄)₂ | 34.1% ethyl acetate | 2.9 | 106 |
| 36% Mg(ClO₄)₂ | 35.7% ethyl acetate | .05 | 106 |
| 36% Mg(ClO₄)₂ | 47.0% ethyl acetate | .58 | 106 |
| 46% Mg(ClO₄)₂ | 38.2% ethyl acetate | Negligible | 106 |
| 46% Mg(ClO₄)₂ | 47.2% ethyl acetate | .02 | 106 |
| 46% Mg(ClO₄)₂ | 42.2% ethyl acetate | .074 | 106 |
| 46% Mg(ClO₄)₂ | 58.8% ethyl acetate | .81 | 106 |
| 46% Mg(ClO₄)₂ | 36.0% butyl acetate | Negligible | 12.5 |
| 46% Mg(ClO₄)₂ | 41.5% butyl acetate | .01 | 12.5 |
| 46% Mg(ClO₄)₂ | 56.9% butyl acetate | .066 | 12.5 |
| 46% Mg(ClO₄)₂ | 33.2% butyl acetate | Negligible | 12.5 |
| 46% Mg(ClO₄)₂ | 72.0% butyl acetate | .695 | 12.5 |
| 32% Mg(ClO₄)₂ | 34.2% butyl acetate | .033 | 12.5 |
| 32% Mg(ClO₄)₂ | 39.5% butyl acetate | .113 | 12.5 |
| 32% Mg(ClO₄)₂ | 42.3% butyl alcohol | .025 | 7.5 |
| 32% Mg(ClO₄)₂ | 41.4% acetophenone | Negligible | .55 |
| 32% Mg(ClO₄)₂ | 63.9% acetophenone | .004 | .55 |
| 32% Mg(ClO₄)₂ | 56.4% benzyl ethyl ether | .49 | 7.46 |
| 32% Mg(ClO₄)₂ | 57.4% benzyl ethyl ether | .57 | 7.46 |
| 36% Mg(ClO₄)₂ | 25.3% ethyl alcohol | Negligible | |
| 36% Mg(ClO₄)₂ | 35.4% ethyl alcohol | Negligible | |

| Percent perchlorate | Percent of substance contained | Vapor pressure observed | Vapor pressure of pure substance | Percent perchlorate | Percent of substance contained | Vapor pressure observed | Vapor pressure of pure substance |
|---|---|---|---|---|---|---|---|
| | | mm. | mm. | | | mm. | mm. |
| 36% Mg(ClO₄)₂ | 33.2% isopropyl alcohol | .02 | | 24% Co(ClO₄)₂ | 13.5% ethyl acetate | .22 | 106 |
| 36% Mg(ClO₄)₂ | 49.7% isopropyl alcohol | .10 | | 24% Co(ClO₄)₂ | 16.6% ethyl acetate | .43 | 106 |
| | | | | 24% Co(ClO₄)₂ | 22.8% ethyl acetate | .37 | 106 |
| | | | | 24% Co(ClO₄)₂ | 28.2% ethyl acetate | .71 | 106 |
| 36% Mg(ClO₄)₂ | 35.9% paraldehyde | 1.43 | | Al(ClO₄)₃ it deliquesces; was dried for 12 hours at 132° C. under reduced pressure. | 26.3%–21.9% ethyl acetate | 9.81 | 106 |
| 36% Mg(ClO₄)₂ | 56.9% paraldehyde | 10.16 | | | 21.9%–19.3% ethyl acetate | 4.34 | 106 |
| 36% Mg(ClO₄)₂ | 46.4% paraldehyde | 4.68 | | | 10.2–5.7% ethyl acetate | 4.96 | 106 |
| 36% Mg(ClO₄)₂ | 34.8% paraldehyde | 1.6 | | | 5.9%–4.7% ethyl acetate | 1.36 | 106 |
| 36% Mg(ClO₄)₂ | 23.6% paraldehyde | .2 | | | | | |
| 36% Mg(ClO₄)₂ | 27.8% methyl ethyl ketone | Negligible | | 23.4% Mn(ClO₄)₂ | 24.7% ethyl acetate | .25 | 106 |
| 36% Mg(ClO₄)₂ | 34.3% methyl ethyl ketone | .155 | | 23.4% Mn(ClO₄)₂ | 30.3% ethyl acetate | .92 | 106 |
| | | | | 23.4% Mn(ClO₄)₂ | 16.7% ethyl acetate | Negligible | 106 |
| 36% Mg(ClO₄)₂ | 29.5% methyl ethyl ketone | Negligible | | 23.4% Mn(ClO₄)₂ | 11.8% ethyl acetate | Negligible | 106 |
| 36% Mg(ClO₄)₂ | 54.0% methyl ethyl ketone | 2.56 | | 23.75% Ni(ClO₄)₂ | 28.0% ethyl acetate | .40 | 106 |
| | | | | 23.75% Ni(ClO₄)₂ | 23.6% ethyl acetate | .095 | 106 |
| | | | | 23.75% Ni(ClO₄)₂ | 19.0% ethyl acetate | .21 | 106 |
| | | | | 23.75% Ni(ClO₄)₂ | 12.7% ethyl acetate | .015 | 106 |
| 32% Mg(ClO₄)₂ | 30.4% acetone | .07 | 226 | 15.9% Ba(ClO₄)₂ | 29.5%–28.4% butyl alcohol | 4.06 | 7.5 |
| 32% Mg(ClO₄)₂ | 37.6% acetone | .50 | 226 | 15.9% Ba(ClO₄)₂ | 29.6%–23.5% ethyl acetate | 14.9 | 106 |
| 32% Mg(ClO₄)₂ | 56.7% acetic anhydride | .63 | | 15.9% Ba(ClO₄)₂ | 14.1%–9.5% ethyl acetate | 6.5 | 106 |
| 32% Mg(ClO₄)₂ | 67.1% acetic acid | .09 | | 15.9% Ba(ClO₄)₂ | 12.3%–10.8% butyl alcohol | 2.33 | 7.5 |
| | | | | Ca(ClO₄)₂ it deliquesces; was used after drying for a period over P₂O₅. | 11.1% butyl alcohol | Negligible | 7.5 |
| | | | | | 10.6% butyl alcohol | Negligible | 7.5 |
| | | | | | 13.6% ethyl acetate | .11 | 106 |
| | | | | | 16.5% butyl alcohol | Negligible | 7.5 |
| | | | | | 16.6% ethyl acetate | .45 | 106 |
| | | | | | 22.9% ethyl acetate | .30 | 106 |
| | | | | | 55.7%–49.9% ethyl acetate | 8.1 | 106 |
| | | | | | 100.8% butyl alcohol | .92 | 7.5 |

These data were obtained at 25° C. by a dynamic method. The absorbent was contained in U tubes and the substances were introduced into the air intake arm of the tube. Because granule size, physical structure, distribution of the substances, and other factors influence moderately the results obtained, these data and other data disclosed in this application are subject to some small discrepancies. However, they represent faithfully the order of magnitude to be obtained in similarly conducted experiments.

The following table shows the indicated absorption of several other illustrative substances when weighed quantities of said substances are vaporized and the air bearing the vapors is passed through weighed absorption tubes containing weighed quantities of the named perchlorates, which, in most instances, are already combined with the indicated quantities of substances:

| Percent perchlorate | Percent of substance contained | Percent of vapors of substance absorbed | Grams per liter | Gas stream rate: cu. ft. per lb. of perchlorate per hour |
|---|---|---|---|---|
| 23.75% Ni(ClO₄)₂ | 25.0% ethyl acetate | 83.7% ethyl acetate | .42 | 4.46 |
| 23.75% Ni(ClO₄)₂ | 24.0% ethyl acetate | 76.3% ethyl acetate | .414 | 41.2 |
| 23.75% Ni(ClO₄)₂ | 13.0% ethyl acetate | 94.8% ethyl acetate | .414 | 41.2 |
| 23.75% Ni(ClO₄)₂ | 19.0% ethyl acetate | 85.6% ethyl acetate | .0167 | 2.15 |
| 23.4% Mn(ClO₄)₂ | 25.0% ethyl acetate | 80.0% ethyl acetate | .369 | 39.8 |
| 23.4% Mn(ClO₄)₂ | 12.0% ethyl acetate | 98.0% ethyl acetate | .369 | 19.9 |
| 23.4% Mn(ClO₄)₂ | 15.2% ethyl acetate | 84.0% ethyl acetate | .0114 | 33.3 |
| Deliquesces Al(ClO₄)₃ | 26.2 ethyl acetate | 64.0% ethyl acetate | .3868 | 68.7 |
| Deliquesces Al(ClO₄)₃ | 6.5% ethyl acetate | 56.0% ethyl acetate | .1386 | 68.7 |
| 24% Co(ClO₄)₂ | 27.1% ethyl acetate | 73.5% ethyl acetate | .3700 | 39.8 |
| 24% Co(ClO₄)₂ | 13.6% ethyl acetate | 97.9% ethyl acetate | .3700 | 19.9 |
| 24% Co(ClO₄)₂ | 16.6% ethyl acetate | 63.7% ethyl acetate | .010 | 3.77 |
| 15.9% Ba(ClO₄)₂ | 22.6% ethyl acetate | 68.0% ethyl acetate | .38 | 3.0 |
| 15.9% Ba(ClO₄)₂ | 0.0% butyl alcohol | 53.0% butyl alcohol | .02 | 7.7 |
| Deliquesces Ca(ClO₄)₂ | 16.5% butyl alcohol | 96.2% butyl alcohol | .02 | 10.7 |
| Deliquesces Ca(ClO₄)₂ | 30.4% butyl alcohol | 92.8% butyl alcohol | .02 | 57.6 |
| Deliquesces Ca(ClO₄)₂ | 71.6% butyl alcohol | 88.9% butyl alcohol | .023 | 23.7 |
| Deliquesces Ca(ClO₄)₂ | 101.0% butyl alcohol | 88.0% butyl alcohol | .02 | 30.2 |

The following table sets forth the observer vapor pressure of the named absorbent plus a definite amount of volatile substance:

Another characteristic feature of the absorbents contemplated by the instant invention is that absorption of the vapors is rapid at the same time that it is complete or nearly complete; and even after the absorbents have taken up a considerable quantity of vapors, the percentage of vapors absorbed is still high, which means that these partially spent absorbents can still be used in stripping the gaseous media of part of their vapor content. These characteristics permit passage of large volumes of the gaseous media through not unduly large quantities of absorbent and obviates the necessity of unduly bulky absorption chambers.

The following table sets forth some of the results observed in the absorption of vapors by the contemplated absorbents held in U tubes:

| Percent perchlorate | Percent of substance contained | Percent of vapors of substance absorbed | Grams per liter | Gas stream rate: cu. ft. per lb. of perchlorate per hour |
|---|---|---|---|---|
| 19.7% Mg(ClO₄)₂ | 34.6% ethyl acetate | 57.0% ethyl acetate | .403 | 16.5 |
| 19.7% Mg(ClO₄)₂ | 34.1% ethyl acetate | 76.0% ethyl acetate | .458 | 3.4 |
| 32.0% Mg(ClO₄)₂ | 46.5% ethyl acetate | 84.0% ethyl acetate | .4 | 3.0 |
| 32.0% Mg(ClO₄)₂ | 58.1% ethyl acetate | 67.5% ethyl acetate | .4 | 3.0 |
| 32.0% Mg(ClO₄)₂ | 35.2% ethyl acetate | 73.0% ethyl acetate | .015 | 9.2 |
| 46.0% Mg(ClO₄)₂ | 47.2% ethyl acetate | 92.0% ethyl acetate | .432 | 40.0 |
| 46.0% Mg(ClO₄)₂ | 50.5% ethyl acetate | 72.5% ethyl acetate | .427 | 67.0 |
| 46.0% Mg(ClO₄)₂ | 54.7% ethyl acetate | 68.0% ethyl acetate | .017 | 2.3 |
| 46.0% Mg(ClO₄)₂ | 42.2% ethyl acetate | 86.0% ethyl acetate | .018 | 16.0 |
| 32.0% Mg(ClO₄)₂ | 36.0% ethyl acetate | 93.0% ethyl acetate | .0093 | 5.75 |
| 32.0% Mg(ClO₄)₂ | 37.4% ethyl acetate | 96.4% ethyl acetate | .4 | 3.0 |
| 46.0% Mg(ClO₄)₂ | 42.8% butyl acetate | 94.5% butyl acetate | .061 | 61.0 |
| 46.0% Mg(ClO₄)₂ | 56.9% butyl acetate | 96.0% butyl acetate | .057 | 3.79 |
| 32.0% Mg(ClO₄)₂ | 49.9% butyl acetate | 95.0% butyl acetate | .0655 | 16.0 |
| 32.0% Mg(ClO₄)₂ | 53.3% butyl acetate | 79.0% butyl acetate | .064 | 85.0 |
| 32.0% Mg(ClO₄)₂ | 39.6% butyl acetate | 87.0% butyl acetate | .054 | 4.1 |
| 32.0% Mg(ClO₄)₂ | 48.6% butyl acetate | 79.0% butyl acetate | .048 | 1.7 |
| 32.0% Mg(ClO₄)₂ | 54.9% butyl alcohol | 93.9% butyl alcohol | .015 | 38.0 |
| 32.0% Mg(ClO₄)₂ | 56.3% butyl alcohol | 87.1% butyl alcohol | .023 | 76.0 |
| 32.0% Mg(ClO₄)₂ | 56.7% butyl alcohol | 100.0% butyl alcohol | .0193 | 5.0 |
| 32.0% Mg(ClO₄)₂ | 50.9% acetic anhydride | 93.4% acetic anhydride | Near saturation | 3.0 |
| 32.0% Mg(ClO₄)₂ | 52.5% acetic acid | 96.1% acetic acid | Near saturation | 3.0 |
| 32.0% Mg(ClO₄)₂ | 32.1% acetone | 97.7% acetone | Near saturation | 3.0 |
| 32.0% Mg(ClO₄)₂ | 63.9% acetophenone | 94.0% acetophenone | .0017 | 42.5 |
| 32.0% Mg(ClO₄)₂ | 64.3% acetophenone | 84.0% acetophenone | .002 | 111.0 |
| 32.0% Mg(ClO₄)₂ | 57.0% benzyl ethyl ether | 85.0% benzyl ethyl ether | .019 | 34.5 |
| 32.0% Mg(ClO₄)₂ | 60.5% benzyl ethyl ether | 75.0% benzyl ethyl ether | .0126 | 75.9 |
| 36.0% Mg(ClO₄)₂ | 36.1% ethyl alcohol | 90.5% ethyl alcohol | .1184 | 23.4 |
| 36.0% Mg(ClO₄)₂ | 53.4% ethyl alcohol | 59.3% ethyl alcohol | .097 | 44.0 |
| 36.0% Mg(ClO₄)₂ | 26.5% ethyl alcohol | 92.0% ethyl alcohol | .023 | 1.45 |
| 32.0% Mg(ClO₄)₂ | 44.6% amyl alcohol | 66.2% amyl alcohol | .0154 | 46.0 |
| 32.0% Mg(ClO₄)₂ | 64.5% amyl alcohol | 80.8% amyl alcohol | .018 | 39.0 |
| 36.0% Mg(ClO₄)₂ | 51.3% isopropyl alcohol | 90.3% isopropyl alcohol | .1316 | 45.0 |
| 36.0% Mg(ClO₄)₂ | 76.2% isopropyl alcohol | 85.0% isopropyl alcohol | .133 | 2.5 |
| 36.0% Mg(ClO₄)₂ | 44.5% paraldehyde | 67.0% paraldehyde | .138 | 3.0 |
| 46.0% Mg(ClO₄)₂ | 0.0% paraldehyde | 100.0% paraldehyde | .138 | 3.0 |
| 36.0% Mg(ClO₄)₂ | 34.1% methyl ethyl ketone | 99.0% methyl ethyl ketone | .33 | 50.0 |
| 36.0% Mg(ClO₄)₂ | 52.0% methyl ethyl ketone | 43.0% methyl ethyl ketone | .402 | 55.0 |
| 36.0% Mg(ClO₄)₂ | 54.2% methyl ethyl ketone | 89.0% methyl ethyl ketone | .300 | 2.8 |

It is here explained that the results hereinbefore set forth were carried out on a laboratory scale at a temperature of approximately 20° C. to approximately 30° C., unless otherwise indicated.

Recovery of the substances absorbed as hereinbefore set forth can be secured by a simple and inexpensive process. The absorbed vapors appear to function somewhat as does water of crystallization. In most instances, as the content of the vapor absorbed increases, the perchlorate salt dissolves in the solvent of crystallization to form a viscous fluid which becomes less viscous as it becomes more diluted by additional vapors absorbed. As this stage is reached, the vapor pressure increases perceptibly, and, in the vapor absorptive process, the liquid is allowed to drain away or is removed from contact with the gas stream to the recovery apparatus. When the vapor pressure of the absorbent plus the absorbed substance approaches the partial pressure of the substance in the gas stream, the absorbent and the absorbed substance are removed and subjected to a process whereby recovery of the absorbed material is made possible. The recovery of these substances may be effected by heating the salt containing the absorbed substance slowly under reduced pressure, whereby the absorbed material is permitted to pass off as a vapor. This process, with alcohols and some other high boiling substances, appears to decompose some of the substance absorbed, and the dried perchloate residue is discolored with carbonaceous material. In this state, the perchloate does not absorb water or other vapors as efficiently as before. The original efficiency can be secured by dissolving the discolored salt in water, filtering, evaporation, and suitable dehydration.

Preferably, the perchlorate plus the absorbed substance can be treated with a small quantity of water to effect complete solution of the salt. When the absorbed substance is one which is not miscible with water, the mixture may be allowed to settle and the substance separated by decantation. The separation in this case may also be secured by fractional distillation. The solution containing the absorbent is evaporated, preferably after filtering, and after dehydration the residue can be re-used in the absorption process.

The apparatus for carrying out the process is simple. The perchlorate, either in solid granular form, or a solution of the perchlorate in a suitable medium if the partial pressure and vapor pressure relationship is suitable, is placed in a suitable apparatus and the gaseous medium passed therethrough. Inasmuch as the perchlorates have a marked tendency to combine with water and thereby lose proportionally the ability to absorb and retain vapors of other substances, I prefer, if the gaseous medium contains any moisture, to remove said moisture in any convenient manner which does not affect the vapors to be absorbed, prior to bringing said medium in contact with the perchlorate. Likewise, I also prefer to remove any suspended solids from the gaseous medium prior to contacting with the perchlorate. The period of contact between the gaseous medium and the absorbent is adjusted so that substantially complete removal of the desired vapors is secured. It is, of course, to be understood that a plurality of absorbent chambers may be provided. When a plurality of vapors are simultaneously absorbed, they may be separated from the absorbent either singly or together. In the latter case, the mixture of the two substances may be separated in any suitable manner, such as fractional distillation, extraction, etc.

Since it is obvious that various changes and modifications may be made in the above description without departing from the nature or spirit thereof, this invention is not restricted thereto except as set forth in the appended claims.

I claim:

1. A method of removing vapors of volatile organic substances, such as alcohols, acids, esters, anhydrides, ketones, amines, aldehydes, etc., from a gaseous medium which comprises causing said gaseous medium to contact with a metallic perchlorate.

2. A method of removing vapors of volatile organic substances, such as alcohols, acids, esters, anhydrides, ketones, amines, aldehydes, etc., from a gaseous medium which comprises causing said gaseous medium to contact with magnesium perchlorate.

3. A method of removing vapors of volatile organic substances, such as alcohols, acids, esters, anhydrides, ketones, amines, aldehydes, etc., from a gaseous medium which comprises causing said gaseous medium to contact with magnesium perchlorate containing from approximately 0 to approximately 50% moisture.

4. A method of removing vapors of volatile organic substances, such as alcohols, acids, esters, anhydrides, ketones, amines, aldehydes, etc., from a gaseous medium which comprises causing said gaseous medium to contact with magnesium perchlorate capable of absorbing approximately 36% of its weight of moisture.

5. A method of recovering vapors of volatile organic substances, such as alcohols, acids, esters, anhydrides, ketones, amines, aldehydes, etc., from a gaseous medium which comprises causing said gaseous medium to contact with a metallic perchlorate, removing the absorbed compound from the said perchlorate, and reusing the perchlorate in the process.

6. A method of recovering vapors of volatile organic substances, such as alcohols, acids, esters, anhydrides, ketones, amines, aldehydes, etc., from a gaseous medium which comprises causing said gaseous medium to contact with magnesium perchlorate containing from approximately 0 to approximately 50% moisture, removing the absorbed compound from the said perchlorate, and reusing the perchlorate in the process.

7. A composition for absorbing vapors of volatile organic substances, such as alcohols, acids, esters, anhydrides, ketones, amines, aldehydes, etc., comprising a metallic perchlorate.

8. A composition for absorbing vapors of volatile organic substances, such as alcohols, acids, esters, anhydrides, ketones, amines, aldehydes, etc., comprising magnesium perchlorate containing approximately 0 to approximately 50% moisture.

GLENN C. FORRESTER.